(12) United States Patent
Zitouni et al.

(10) Patent No.: US 9,133,733 B2
(45) Date of Patent: Sep. 15, 2015

(54) TURBINE DETUNER FOR RECOVERING KINETIC ENERGY FROM GAS TURBINE ENGINE EXHAUST GASES

(75) Inventors: Gley Zitouni, Ottawa (CA); Maxime Cloutier, Montreal (CA); Martin Gratton, Ottawa (CA)

(73) Assignee: MDS AERO SUPPORT CORPORATION, Ottawa (CA)

( * ) Notice: Subject to any disclaimer, the term of this patent is extended or adjusted under 35 U.S.C. 154(b) by 1049 days.

(21) Appl. No.: 12/832,768

(22) Filed: Jul. 8, 2010

(65) Prior Publication Data

US 2011/0138772 A1   Jun. 16, 2011

(30) Foreign Application Priority Data

Dec. 16, 2009   (EP) .................................... 09179533

(51) Int. Cl.
*G01M 15/14*   (2006.01)
*F01D 25/30*   (2006.01)
(Continued)

(52) U.S. Cl.
CPC  *F01D 25/30* (2013.01); *F01N 5/04* (2013.01); *F02C 6/006* (2013.01); *F03D 9/002* (2013.01); *G01M 15/14* (2013.01); *F01N 13/007* (2013.01); *F05D 2260/96* (2013.01); *G01M 15/02* (2013.01)

(58) Field of Classification Search
CPC ......... F03D 9/002; F01N 5/04; F01N 13/007; G01M 15/02; G01M 15/14
USPC ............ 60/226.1; 73/112.01, 112.03, 112.04, 73/116.03, 118.03
See application file for complete search history.

(56) References Cited

U.S. PATENT DOCUMENTS 2,634,578 A * 4/1953 Kallal ...................... 239/265.39
3,273,654 A * 9/1966 Pinnes .......................... 416/142
(Continued)

FOREIGN PATENT DOCUMENTS

DE     100 48 789 A1   4/2002
EP      0 717 278 A2   6/1996
(Continued)

OTHER PUBLICATIONS

Soares, Claire, "Gas Turbines A Handbook of Air, Land and Sea Applications", Butterworth-Heinemann, an imprint of Elsevier Inc., 2008, pp. 398-400.*
(Continued)

*Primary Examiner* — Ehud Gartenberg
*Assistant Examiner* — Lorne Meade
(74) *Attorney, Agent, or Firm* — Lewis Brisbois Bisgard & Smith LLP; Jon E Hokanson

(57) ABSTRACT

A gas turbine engine test cell has a turbine detuner capable of recovering kinetic energy from exhaust gases emitted by a gas turbine engine while also detuning the exhaust flow to reduce unwanted infrasound. The gas turbine engine test cell includes a test cell building, a thrust frame for mounting the gas turbine engine, and the turbine detuner disposed downstream of the thrust frame for extracting energy from the exhaust gases of the gas turbine engine when in operation. The turbine detuner has an inlet for receiving the exhaust gases, a kinetic energy recovery mechanism (e.g. stator and rotor) for converting the kinetic energy of the exhaust gases into rotary power, and an outlet through which de-energized exhaust gases are emitted after being de-energized by the kinetic energy recovery mechanism. By eliminating the augmentor, the test cell is more compact. The turbine detuner not only reduces infrasound but also recovers otherwise wasted energy.

5 Claims, 2 Drawing Sheets

(51) Int. Cl.
*F01N 5/04* (2006.01)
*F03D 9/00* (2006.01)
*F02C 6/00* (2006.01)
*F01N 13/00* (2010.01)
*G01M 15/02* (2006.01)

(56) References Cited

U.S. PATENT DOCUMENTS

| | | | | |
|---|---|---|---|---|
| 3,710,617 | A * | 1/1973 | Andersen | 73/116.03 |
| 3,811,791 | A * | 5/1974 | Cotton | 416/129 |
| 5,203,164 | A * | 4/1993 | Paulson | 60/226.1 |
| 5,293,775 | A * | 3/1994 | Clark et al. | 73/116.03 |
| 5,505,587 | A * | 4/1996 | Ghetzler | 415/49 |
| 5,837,890 | A * | 11/1998 | Long | 73/116.03 |
| 5,998,882 | A * | 12/1999 | Alston | 290/54 |
| 6,270,309 | B1 * | 8/2001 | Ghetzler et al. | 415/35 |
| 6,497,137 | B2 * | 12/2002 | Helgeson | 73/23.31 |
| 7,380,751 | B1 * | 6/2008 | Henson | 244/114 B |
| 7,565,269 | B2 * | 7/2009 | Parfitt et al. | 702/182 |
| 2007/0009728 | A1 * | 1/2007 | Aoki et al. | 428/304.4 |
| 2007/0276601 | A1 * | 11/2007 | Parfitt et al. | 702/1 |

FOREIGN PATENT DOCUMENTS

| | | |
|---|---|---|
| EP | 1 860 416 A2 | 11/2007 |
| EP | 2 045 448 A1 | 4/2009 |
| JP | 58 218633 A | 12/1983 |
| JP | 10 019737 A | 1/1998 |

OTHER PUBLICATIONS

H. W. Ho, "Investigation into the Vortex Formation Threshold and Infrasound Generation in a Jet Engine Test Cell", PhD Thesis, University of Canterbury, New Zealand, 2009, pp. 160-180.*
Communication from the European Patent Office (Extended European Search Report Application No. 09 179 533.6) Complete document is relevant.

* cited by examiner

TURBINE DETUNER FOR RECOVERING KINETIC ENERGY FROM GAS TURBINE ENGINE EXHAUST GASES

CROSS-REFERENCE TO RELATED APPLICATIONS

This application claims the benefit of priority from European Patent Application No. 09179533.6 filed Dec. 16, 2009.

TECHNICAL FIELD

The present invention relates generally to kinetic energy recovery systems and, in particular, to recovery of kinetic energy from gas turbine engines.

BACKGROUND

Gas turbine engine test cells are well known in the art and are used for testing and measuring performance of newly designed or recently overhauled gas turbine engines. An example of a typical out-of-airframe engine test cell is shown in FIG. 1. Such test cells commonly include an inlet stack 10, a test section 20 housing the gas turbine engine 30 to be tested, an augmentor tube 40 and an exhaust stack 50.

As depicted in FIG. 1, the inlet stack 10 of the conventional test cell typically includes intake splitters 12 (for acoustic treatment) and turning vanes 14. Separating the intake stack from the test section 20 is typically a flow screen 16 with a roll-up door 18.

As further depicted in FIG. 1, the test section 20 typically comprises a thrust frame 22 and monorail system 24 for mounting the gas turbine engine 30. In this conventional test cell, exhaust gases from the gas turbine engine are exhausted into an ejector comprising an augmentor tube 40, diffuser 41 and exhaust basket 42. The augmentor tube may be enclosed within a chamber known as an augmentor enclosure 51. The augmentor tube detunes the flow of exhaust gas. Exhaust gases are then emitted into the exhaust stack 50 from the exhaust basket 42.

During operation, the engine draws air into the test section through the inlet stack and exhausts flow out of the test section and into a large diameter tubular structure commonly referred to as an augmentor or augmentor tube which is connected to a diffuser and exhaust basket. Flow is directed from the augmentor, diffuser and basket into the base of a vertically oriented exhaust stack which exhausts to atmosphere.

Gas turbine engine test cells of the type described above are designed to function as a pump to maintain sufficient air flow through the test section to provide proper aerodynamic simulation and flow rates while minimizing noise and vibration to the surrounding environment.

The problem of noise treatment for a gas turbine engine test cell generally falls into two categories defined by two distinct regions of the sound frequency spectrum: the audible range which is generally acknowledged to extend from approximately 20 Hz through about 20 kHz and the inaudible ("infrasound") range occurring at relatively low frequencies from a few Hz to about 50 Hz. Both frequency ranges present distinct problems and concerns and thus require different solutions.

The audible part of the sound spectrum generated by the test cell corresponds to wavelengths which are small relative to the characteristic dimensions of the test cell and results principally from sound waves propagating from the test engine, through the system and out into the environment. The accepted solutions for dealing with sound waves in the audible frequencies are straightforward and commonly involve the use of acoustic baffles in the inlet stack and exhaust stack as well as the use of acoustic pillows. It has been found that such baffles and pillows are able to dissipate sound waves in the audible frequency range to an acceptably low level.

Infrasound, however, occurs at wavelengths that are large relative to the characteristic dimensions of the test cell and thus result in what are considered standing wave patterns rather than propagating noise. Although infrasound is not audible, and thus does not present readily detectable concerns to the surrounding population, the relatively large wavelengths of infrasound present its own unique set of problems and concerns. For example, large buildings and other structures or parts thereof will vibrate or tend to vibrate at certain natural frequencies in the infrasound range. The concern is that repeated exposure to infrasound frequencies over an extended period of time could result in structural problems. The concern exists not only with respect to buildings and other structures in existence at the time the test cell is installed, but buildings and other structures which may be erected years later as the community and surrounding businesses develop. Furthermore, there are health concerns with respect to these vibrations.

Although a variety of sound attenuation techniques are known in the art, infrasound remains problematic with augmentor tubes. Hard-to-treat low-frequency noise is known to develop inside the augmentor tube as the jet turbulent eddies grow inside the tube. A further issue with augmentor tubes is ensuring that the augmentor tube is able to pump the minimum amount required to meet the total air mass flow rate required for the test chamber.

A further challenge with respect to gas turbine engine test cells is their substantial size. Due to the length of the augmentor tubes, the ejector systems typically range from 10 to 60 meters long (30 to 190 ft). A long ejector system is required for adequate air flow mixing and test cell ventilation (test cell bypass). Conventional test cells thus typically occupy a large footprint, which means that it is often difficult and expensive to acquire the land to build a new test cell.

Yet a further problem that arises with conventional test cells is that an existing facility cannot easily be enlarged to accommodate testing of larger and more powerful engines. To enlarge an existing facility requires that the building be renovated or extended to accommodate a longer ejector system. This may only be possible where adjoining lands are available.

In view of these various issues and challenges with the prior art technology, there remains a definite need in the industry for an improved gas turbine engine test cell and an improved method for testing gas turbine engines.

SUMMARY

The present invention provides a novel turbine detuner for detuning the flow of gas turbine engine exhaust gases (i.e. reducing infrasound) and for recovering kinetic energy from these exhaust gases.

The present invention also provides a novel method for detuning the gas turbine engine exhaust gases and for recovering kinetic energy from the exhaust gases. In addition to the harnessing of otherwise wasted power, this invention reduces infrasound by detuning the flow more effectively than an augmentor.

The present invention further provides a novel test cell incorporating this turbine detuner instead of an ejector system with augmentor tube and exhaust basket. The turbine detuner not only harnesses kinetic energy from the exhaust gases but also detunes the exhaust flow without requiring an augmentor tube or exhaust basket. Furthermore, by eliminating the augmentor tube, the test cell can be much more compact. Compactness is very important because this means that the test cell can be built on a smaller tract of land. Also, this means that an existing facility can be used to test larger and more powerful engines without having to enlarge or lengthen the existing facility, which would conventionally require extending the augmentor tube. Thus, to summarize, there are three main advantages to this innovative turbine detuner in a gas turbine engine test cell: (1) energy recovery from the exhaust gases; (2) improved attenuation of unwanted infrasound; and (3) elimination of the ejector system (augmentor tube) in favour of a more compact design.

In accordance with one main aspect of the present invention, a turbine detuner recovers kinetic energy from exhaust gases emitted by a gas turbine engine and also detunes the exhaust gas flow. The turbine detuner comprises an inlet for receiving the exhaust gases emitted by the gas turbine engine, a kinetic energy recovery mechanism for converting the kinetic energy of the exhaust gases into rotary power, and an outlet through which de-energized exhaust gases are emitted after being de-energized by the kinetic energy recovery mechanism. The turbine detuner may also include means for extracting power from the kinetic energy recovery mechanism.

In accordance with another main aspect of the present invention, a method for recovering kinetic energy from exhaust gases emitted from a gas turbine engine while also detuning the exhaust flow entails securely mounting the gas turbine engine, installing a turbine detuner downstream of the gas turbine engine, operating the gas turbine engine to produce exhaust gases for driving the turbine detuner to thereby enable the turbine detuner to recover kinetic energy from the exhaust gases, and extracting energy from the turbine detuner.

In accordance with yet another aspect of the present invention, a gas turbine engine test cell capable of recovering kinetic energy from exhaust gases emitted by a gas turbine engine while also detuning the exhaust flow comprises a test cell building, a mount for mounting the gas turbine engine to be tested, and a turbine detuner disposed downstream of the mount for extracting energy from the exhaust gases of the gas turbine engine when in operation.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

In general, and by way of overview, the present invention is directed to a turbine detuner capable of recovering kinetic energy from exhaust gases produced and moved by gas turbine engines while also detuning the exhaust gases to reduce unwanted infrasound.

Figures 1, 2:
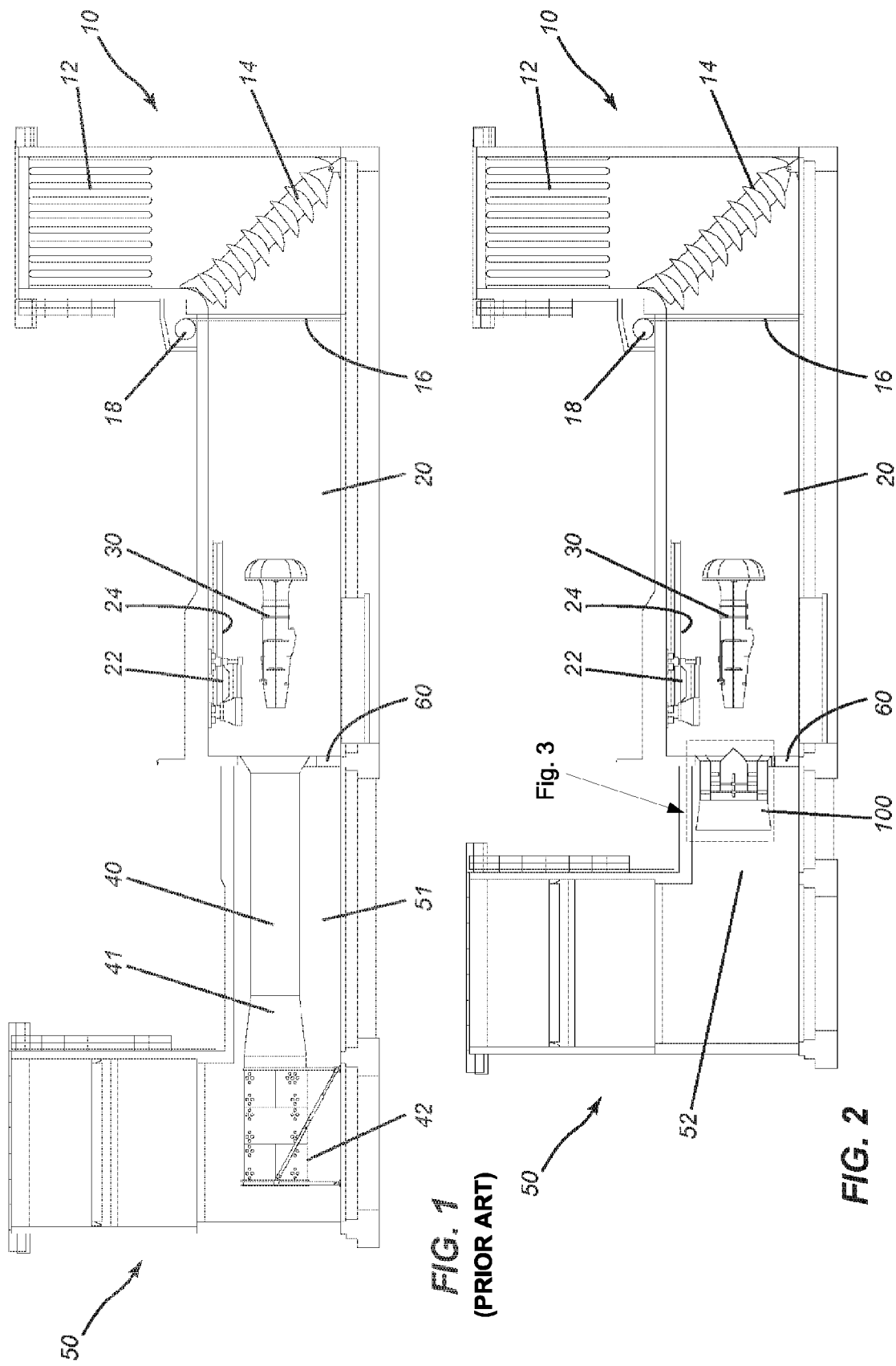
FIG. 1 is a cross-sectional view of a conventional gas turbine engine test cell having an ejector that includes an augmentor tube for receiving exhaust gases from a gas turbine engine.
FIG. 2 is a cross-sectional view of a novel gas turbine engine test cell incorporating a turbine detuner for extracting energy from exhaust gases emitted by a gas turbine engine while also detuning the exhaust flow in accordance with an embodiment of the present invention.

FIG. 2 is a cross-sectional view of a novel gas turbine engine test cell incorporating a turbine detuner 100 in accordance with an embodiment of the present invention. This turbine detuner, as will be elaborated below, extracts energy from exhaust gases emitted by the gas turbine engine 30 and also detunes the exhaust flow to reduce undesirable infrasound.

As depicted in FIG. 2, the novel gas turbine engine test cell comprises an intake stack 10 (or inlet stack), a test section 20 in which the gas turbine engine 30 is mounted, the turbine detuner 100 and an exhaust stack 50. As illustrated in FIG. 2, the inlet stack 10 of the test cell is identical to the inlet stack 10 of the conventional test cell shown in FIG. 1 and may include the same intake splitters 12 (for acoustic treatment) and turning vanes 14. Separating the intake stack from the test section 20 may be a flow screen 16 with a roll-up door 18, as found in the conventional test cell.

As further depicted in FIG. 2, the test section 20 comprises a thrust frame 22 and monorail system 24 for mounting the gas turbine engine 30. In this novel test cell, exhaust gases from the gas turbine engine are exhausted into the turbine detuner 100 instead of into an ejector or augmentor tube. As such, the augmentor tube, diffuser and exhaust basket are eliminated entirely from the novel test cell. The turbine detuner, instead of the augmentor tube, detunes the outflow of exhaust gases. The turbine detuner is more effective at detuning than the conventional augmentor tube. Accordingly, the novel turbine detuner reduces infrasound more effectively than does a conventional augmentor tube. The turbine detuner not only detunes the exhaust flow but also recovers kinetic energy from the exhaust gases. The turbine detuner thus de-energizes the exhaust gases emitted by the engine under test. The energy that is extracted can be used to power the test cell, can be fed back into the grid, or used for any other desired purpose.

After the exhaust gases pass through the turbine detuner 100, these de-energized exhaust gases are then emitted directly into the horizontal detuner enclosure 52. The latter enclosure is a chamber continuous with the exhaust stack 50, as depicted in FIG. 2.

Figure 3:
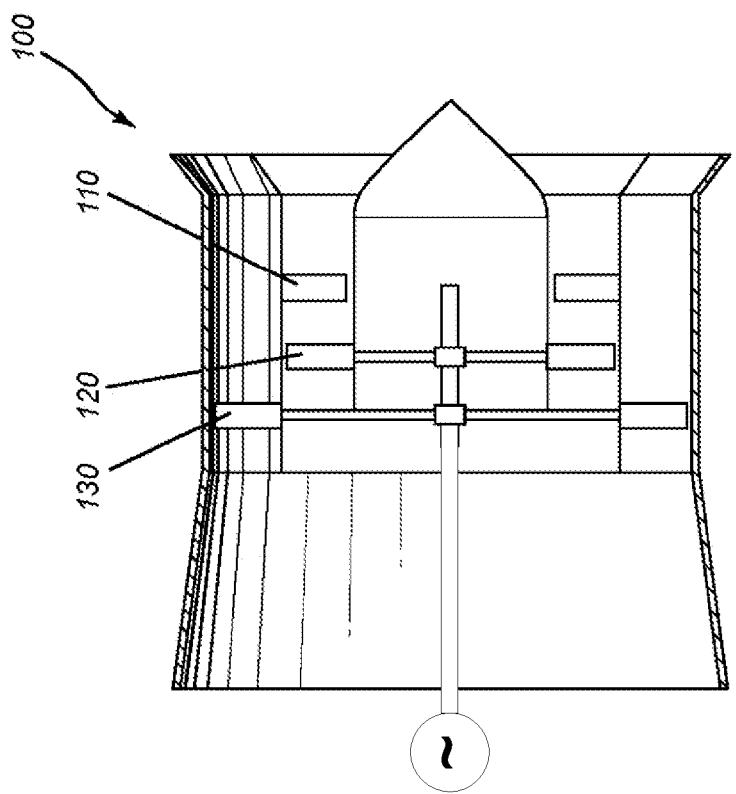
FIG. 3 is a cross-sectional view of the novel turbine detuner in accordance with an embodiment of the present invention.

FIG. 3 is a cross-sectional view of the novel turbine detuner 100 in accordance with an embodiment of the present invention. As shown in FIG. 3, the turbine detuner 100 has an inlet for receiving the exhaust gases emitted by the gas turbine engine. The turbine detuner 100 also includes a kinetic energy recovery mechanism for converting the kinetic energy of the exhaust gases into rotary power. This mechanism may be a stator and rotor mechanism for generating electric power. The turbine detuner also includes an outlet through which de-energized exhaust gases are emitted after being de-energized by the kinetic energy recovery mechanism. This turbine detuner 100 thus recovers kinetic energy from the exhaust gases emitted by the gas turbine engine. The turbine detuner also detunes the exhaust gases so that unwanted resonance effects are eliminated or at least substantially mitigated. Because this turbine detuner attenuates the infrasound radiating from the test cell, the risk of damage and/or nuisance to surrounding buildings, dwellings and structures is minimized.

In the specific embodiment illustrated in FIG. 3, the turbine detuner 100 includes a stator 110, a turbine 120 and a bypass fan 130. The turbine 120 generates electric power. Rotation of the turbine drives the bypass fan either mechanically or electrically to cause entrainment of bypass air. Any suitable mechanical coupling means (shaft) or electrical coupling means may be employed for this purpose. This bypass air improves the performance of the test cell by ensuring good flow characteristics in the test section. In a simple test facility, mechanical coupling will likely be sufficient and the simplest and least expensive solution; however, in more complicated facilities that test a broad range of engines, more control over the speed of the bypass fan may be desirable, and thus a separate electric motor might be needed to operate independently of the turbine speed.

Figure 4:
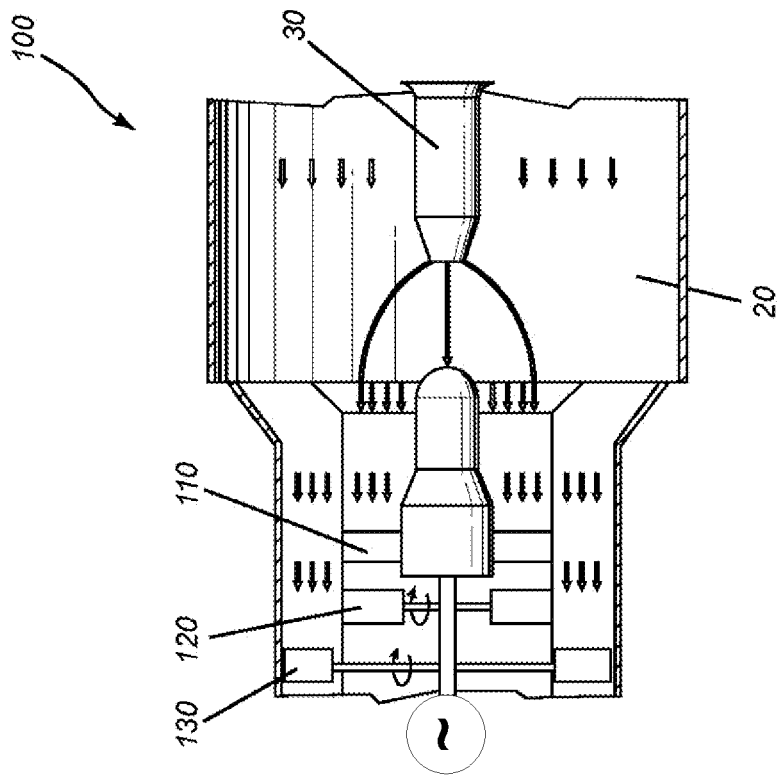
FIG. 4 is a cross-sectional view of the novel turbine detuner, depicting air flow and exhaust flow into the turbine detuner.

FIG. 4 is a cross-sectional view of the novel turbine detuner, depicting air flow and exhaust flow into the turbine detuner. As can be seen in this figure, the turbine detuner is spaced downstream from the nozzle exit plane of the gas turbine engine under test to ensure that all exhaust gases are captured by the detuner. It is believed that a spacing of approximately two engine nozzle diameters (between the nozzle exit plane of the engine and the inlet of the detuner) provides the best performance for the detuner. Test section air flow around the engine is entrained by the bypass fan, as depicted in this figure.

The energy recovery potential of this novel technology can be estimated as follows. Assuming T=25000 lbs of thrust and Wj=300 kg/s as the engine flow rate, and further assuming that the turbine detuner has turbine pressure ratio Prt=1.3, an efficiency E=75% and a percentage of entrained flow by the exposed jet Wb=25%, then the estimated power extracted from this 25000 lbf engine would be:

$$PWt = \frac{\gamma}{\gamma-1} RT\eta \left[\left(\frac{P2}{P1}\right)^{\frac{\gamma}{\gamma-1}} - 1\right](Wj + Wb) \sim 11 \text{ MW}$$

As will be readily appreciated, this is a very substantial amount of power. For larger engines, more power will be extracted. This power can be used for any desired application such as, for example, powering the test cell, surrounding facilities, specific machinery or equipment, or fed back into the power grid (i.e. sold back to the electric power utility company). Alternatively, the rotary power of the turbine detuner may be harnessed by any other suitable mechanical means to drive machinery, equipment, etc. without necessarily converting the power into electricity.

From the foregoing, it should now be apparent that the kinetic energy in the exhaust gases (engine nozzle outlet gases) causes the detuner device to rotate and thus produce device shaft power. Part of the device-produced shaft power may be used to move air around the tested engine (engine bypass air) by way of mechanical fan means (e.g. bypass fan 130) or by electrical fan means. Device-produced shaft power that is not used to move engine bypass air can be applied to any other power needs, as noted earlier. Therefore, energy from the outlet gases can be harnessed without causing an unacceptable back-pressure on the gas turbine engine from which kinetic energy is being recovered. In other words, energy recovery does not affect the performance of the engine under test nor does it affect the measurements made or the test results. The detuner device can recover kinetic energy from outlet gases for a broad range of engine sizes. This means that a test cell equipped with the turbine detuner is extremely versatile. As will be appreciated, the recovery device (detuner) is constructed to withstand the temperature and pressure variations imposed by the gas turbine engine exhaust gases.

In the main implementation described above, the turbine detuner is used indoors (i.e. inside a gas turbine engine test cell). However, in another implementation, the turbine detuner 100 may be used outdoors. This energy-recovery device (turbine detuner) may be placed downstream of a gas turbine engine to recover some of the kinetic energy of the exhaust gases emitted by the engine. In an exterior (outdoors) test facility, such as, for example, on an outdoor test stand, the gas turbine engine is mounted securely to a concrete base or other immovable structure. This base or structure is, of course, installed in a field, clearing or other such location where the jet blast, noise and vibration does not cause any damage or nuisance. One or more energy-recovery devices (e.g. one or more of the turbine detuners disclosed herein) may be placed behind the nozzle of the gas turbine engine to recover kinetic energy.

While the novel test cell has been depicted with vertical intake and exhaust stacks, it should be understood that the intake and exhaust could be horizontal. A horizontal intake and horizontal exhaust would include silencers (acoustic baffles) that are positioned horizontally.

The embodiments of the invention described above are intended to be exemplary only. As will be appreciated by those of ordinary skill in the art, to whom this specification is addressed, many obvious variations, modifications and refinements can be made to the embodiments presented herein without departing from the spirit and scope of the inventive concept(s). The scope of the exclusive right sought by the applicant(s) is therefore intended to be limited solely by the appended claims.

The invention claimed is:

1. A turbine detuner for generating electric power from exhaust gases emitted by a gas turbine engine while also detuning the exhaust gases, the gas turbine engine operating indoors inside a test section of an off-the-airframe engine test cell in which bypass air flows around the gas turbine engine, the turbine detuner comprising:
   a. an inner annular duct having an inlet for receiving the exhaust gases emitted by the gas turbine engine that is operating off the airframe, the inlet being spaced downstream from the gas turbine engine such that the turbine detuner is mechanically decoupled from the gas turbine engine;
   b. a kinetic energy recovery mechanism facing the gas turbine engine, the kinetic energy recovery mechanism having a stator and a turbine, the turbine rotating a rotor for converting kinetic energy of the exhaust gases into electric power by driving a generator while also detuning the exhaust gases to reduce infrasound generated by the test cell, the stator and the turbine located within the inner annular duct;
   c. a bypass fan located within an outer annular duct, the outer annular duct concentric with and circumscribing the inner annular duct, the bypass fan driven by the turbine, the bypass fan entraining the bypass air into the outer annular duct to ensure good flow characteristics in the test section of the off-the-airframe engine test cell, wherein the turbine detuner is secured a fixed distance downstream from a nozzle exit plane of the gas turbine engine; and d. an outlet of the inner annular duct through which de-energized exhaust gases are emitted after being de-energized by flowing the exhaust gases from the inlet, through the stator, and then through the turbine which converts the kinetic energy of the exhaust gases into rotary power.

2. The turbine detuner as claimed in claim 1 wherein the bypass fan is mechanically coupled to the rotor.

3. A method for generating electric power from exhaust gases emitted from a gas turbine engine while also detuning the exhaust gases, the method comprising:
 a. securely mounting the gas turbine engine to a thrust frame inside a test section of an off-the-airframe gas turbine engine test cell that has no augmentor tube;
 b. permanently installing a turbine detuner downstream of and facing the gas turbine engine such that the turbine detuner is secured a fixed distance downstream from the gas turbine engine such that the turbine detuner is mechanically decoupled from the gas turbine engine;
 c. operating the gas turbine engine off the airframe to produce exhaust gases for driving the turbine detuner by flowing the exhaust gases through a stator and a turbine located within an inner annular duct of the turbine detuner to thereby enable the turbine detuner to recover kinetic energy from the exhaust gases while also detuning the exhaust gases to reduce infrasound generated by the test cell, wherein operating the gas turbine engine causes bypass air to flow around the gas turbine engine;
 d. entraining bypass air using a bypass fan located within an outer annular duct, the outer annular duct concentric with and circumscribing the inner annular duct, the bypass fan driven by the turbine to ensure good flow characteristics in the test section; and
 e. extracting energy from the turbine to generate electric power by driving a generator via a rotor connected to the turbine.

4. An off-the-airframe gas turbine engine test cell for generating electric power from exhaust gases emitted by a gas turbine engine being tested while also detuning the exhaust gases, the gas turbine engine test cell comprising:
 a. a test cell building having an intake stack at a first end of the building and an exhaust stack at a second end of the building, wherein the test cell building has no augmentor tube;
 b. a test section extending from the intake stack to the exhaust stack;
 c. a thrust frame for mounting the gas turbine engine inside the test section of the off-the-airframe gas turbine engine test cell in a position that enables bypass air to flow around the gas turbine engine when the gas turbine engine is in off-the-airframe operation;
 d. a bypass fan located within an outer annular duct, the outer annular duct concentric with and circumscribing an inner annular duct, the bypass fan driven by a turbine, the bypass fan entraining the bypass air into the outer annular duct to ensure good flow characteristics in the test section; and
 e. a turbine detuner facing the gas turbine engine and disposed downstream of the thrust frame, the turbine detuner comprising the inner annular duct, the turbine, a stator, a rotor, the outer annular duct, and the bypass fan, wherein the stator and the turbine are located within the inner annular duct, and the rotor is mechanically connected to the turbine, wherein flowing the exhaust gases through the stator and the turbine extracts usable energy from the exhaust gases of the gas turbine engine to generate electric power by driving a generator while also detuning the exhaust gases to reduce infrasound generated by the test cell building when the gas turbine engine is in off-the-airframe operation inside the test section, such that the turbine detuner is spaced downstream and mechanically decoupled from a nozzle exit plane of the gas turbine engine.

5. The gas turbine engine test cell as claimed in claim 4 wherein the bypass fan is mechanically coupled to the rotor.

* * * * *